United States Patent
Gibbons et al.

(10) Patent No.: US 11,014,462 B2
(45) Date of Patent: May 25, 2021

(54) METHODOLOGY OF MAXIMIZING CHARGING POWER TRANSFER FOR ELECTRIC VEHICLE WHEN AC VOLTAGE SAGS

(71) Applicant: LEAR CORPORATION, Southfield, MI (US)

(72) Inventors: Michael Scott Gibbons, Garden City, MI (US); Carl L. Gilbert, Southfield, MI (US); Manjiri S. Deshpande, Farmington Hills, MI (US)

(73) Assignee: LEAR CORPORATION, Southfield, MI (US)

(*) Notice: Subject to any disclaimer, the term of this patent is extended or adjusted under 35 U.S.C. 154(b) by 642 days.

(21) Appl. No.: 15/801,772

(22) Filed: Nov. 2, 2017

(65) Prior Publication Data

US 2019/0126762 A1 May 2, 2019

(51) Int. Cl.
*H02J 7/00* (2006.01)
*B60L 53/20* (2019.01)
*B60L 58/10* (2019.01)
*H02J 3/18* (2006.01)
*H02J 7/04* (2006.01)

(52) U.S. Cl.
CPC .............. *B60L 53/20* (2019.02); *B60L 58/10* (2019.02); *H02J 3/18* (2013.01); *H02J 7/045* (2013.01); *B60L 2210/30* (2013.01)

(58) Field of Classification Search
CPC ...................................................... B60L 53/20

USPC .......................................................... 320/109
See application file for complete search history.

(56) References Cited

U.S. PATENT DOCUMENTS

| | | | |
|---|---|---|---|
| 8,755,964 B2* | 6/2014 | Ang | B60L 53/14 701/22 |
| 8,948,946 B2 | 2/2015 | Ballnik et al. | |
| 9,481,357 B2* | 11/2016 | Namuduri | B60W 20/10 |
| 2012/0235640 A1 | 9/2012 | Bridges et al. | |
| 2013/0257146 A1* | 10/2013 | Nojima | B60L 53/30 307/9.1 |
| 2015/0015213 A1* | 1/2015 | Brooks | H02J 3/24 320/137 |
| 2015/0061569 A1* | 3/2015 | Alexander | B60L 53/18 320/101 |
| 2015/0091377 A1 | 4/2015 | Namou et al. | |
| 2017/0036555 A1 | 2/2017 | Albanna et al. | |
| 2018/0201142 A1* | 7/2018 | Galin | H01R 13/6683 |

* cited by examiner

*Primary Examiner* — Yalkew Fantu
(74) *Attorney, Agent, or Firm* — Brooks Kushman P.C.

(57) ABSTRACT

A method for charging a battery in an electric or hybrid vehicle provides an alternative to switching to low tap. In accordance with this method, if a tap cross occurs, an OBCM reduces its power limit by a configurable amount and then retries charging at a lower level. This process can be repeated as many times as it takes to find a power level that prevents a tap cross. Advantageously, the battery can be charged in the shortest amount of time instead of limiting the power to the low tap level. A charging system implementing the method is also provided.

20 Claims, 3 Drawing Sheets

METHODOLOGY OF MAXIMIZING CHARGING POWER TRANSFER FOR ELECTRIC VEHICLE WHEN AC VOLTAGE SAGS

TECHNICAL FIELD

The present invention is related to systems and methods for charging batteries in hybrid and electric vehicles.

BACKGROUND

Electric and hybrid vehicle are typically charging using generally available electrical outlet. Outlets around the world are typically in the 120 VAC range (low tap) or the 220 VAC range (high tap). Due to this availability, manufacturers of PFC (power factor correction) integrated circuits have designed their integrated circuits to operate in a low tap range or a high tap range. The power limit between high tap and low tap range can be ½ of the high tap limit. While a plug-in hybrid and/or electric vehicle is being charged sometimes the AC supply sags so low that the voltage level is too low to operate in the high tap range causing a tap cross. The AC voltage sag is due to the onboard control module (OBCM) loading down the AC source. When this happens, a battery charger utilizing power factor correction will have to switch to the lower tap.

Accordingly, there is systems for charging batteries in hybrid and electric vehicles.

SUMMARY

In at least one embodiment, the present invention solves one or more problems of the prior art by providing a method for charging a battery in a hybrid or electric vehicle. In general, the method provides an alternative to switching to low tap in that the OBCM will reduce its power limit by a configurable amount (X) and retry charging at a lower level. This process can be repeated as many times as it takes to find a power level that prevents a tap cross. In this way, the battery can be charged in the shortest amount of time instead of limiting the power to the low tap level. In another embodiment, a method for charging a battery from an alternating current voltage power supply is provided. The method includes a step of measuring an input voltage from the alternating current voltage power supply provided to the voltage converter. Characteristically, the voltage converter draws a predetermined maximum power limit from the alternating current voltage power supply. Initially, the predetermined maximum power limit is set to an initial maximum power limit. An updated maximum power limit is determined as the predetermined maximum power limit minus a predetermined amount X if the input voltage is below a predetermined input voltage setpoint. The predetermined maximum power limit is set to the updated maximum power limit. These steps are iteratively repeated until the input voltage from the alternating current voltage power supply provided to the voltage converter is above or equal to the predetermined input voltage setpoint.

In another embodiment, a system for charging a battery in an electric or hybrid vehicle using the methods set forth herein is provided. The system includes a voltage converter having an input that receives an AC voltage input and an output that outputs a direct current voltage. The voltage converter has a configurable maximum power limit that the voltage converter can draw. A voltage sensor performs a voltage measurement of the AC input voltage to the voltage converter. A computer processor receives the voltage measurement from the voltage sensor. Advantageously, the computer processor is configured to send a control signal to the voltage converter to by iteratively reducing its power limit by a configurable amount (X) and then retry charging at a lower level until a tap cross is avoided.

DETAILED DESCRIPTION

Figure 1:
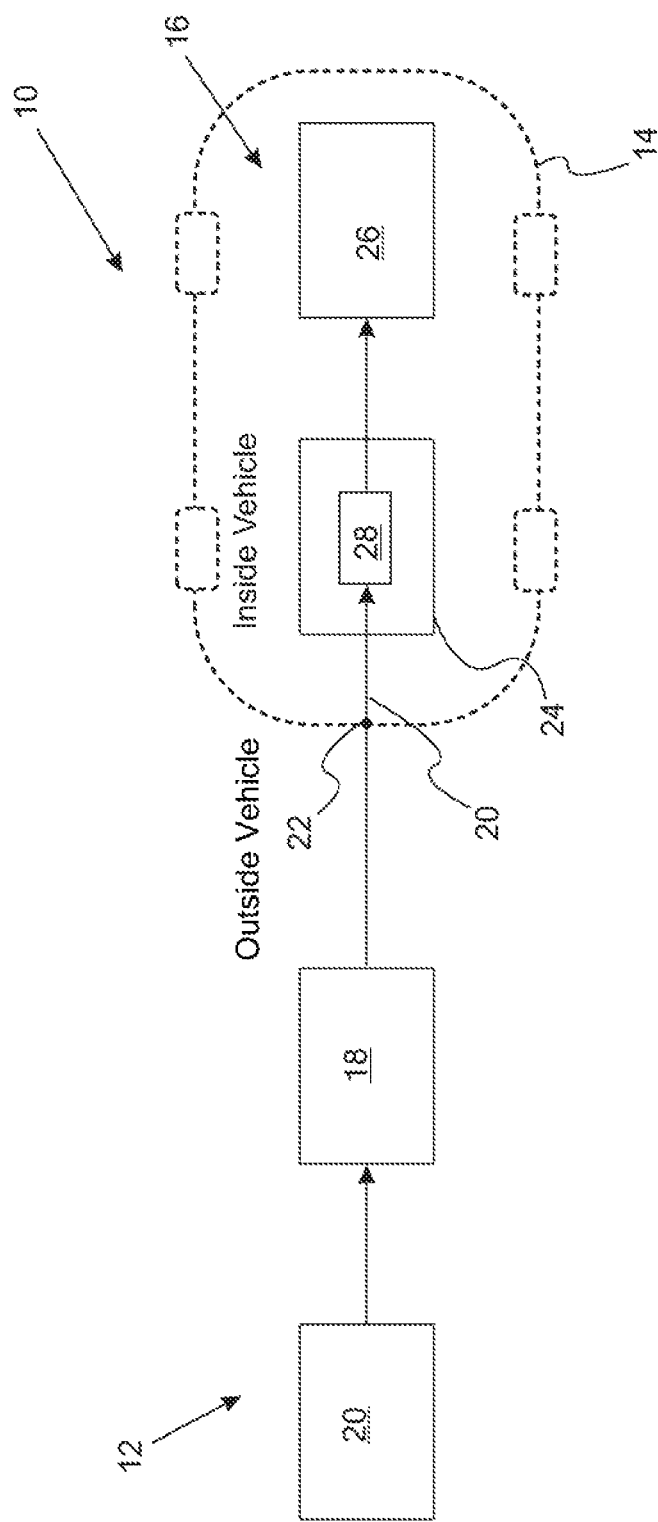
FIG. 1 is a schematic of a battery charging system for charging a high voltage battery in an electric or hybrid electric vehicle.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

With reference to FIG. 1, a schematic of a vehicle charging system is provided. Vehicle charging system 10 includes external components 12 that are located external to vehicle 14 and internal components 16 that are within the vehicle. External components 12 include electric vehicle supply equipment (EVSE) 18 which is in communication with alternating current AC) voltage power supply 20 (e.g., an electrical power grid). EVSE 18 is attached to adapter 22 (e.g., a plug) provides power for charging to electrical bus 20 from AC voltage power supply 20. Typically, an alternating current (AC) voltage is used for charging. Internal components 16 include onboard controller module (OBCM) 24 which receives power from EVSE 18 through electrical bus 20. OBCM 24 converts the input signal form an AC voltage to a direct current (DC) voltage to be used to charge high voltage battery 26 which is in electrical communication with OBCM 24. In a refinement, high voltage battery 26 operates at a voltage of about 180 to 600 volts. Typically, the voltage conversion is accomplished by voltage converter 28. As set forth in more detail below, OBCM provides an alternative to switching to low tap during charging by iteratively reducing its power limit by a configurable amount (X) and then retry charging at a lower level until a tap cross is avoided.

Figure 2:
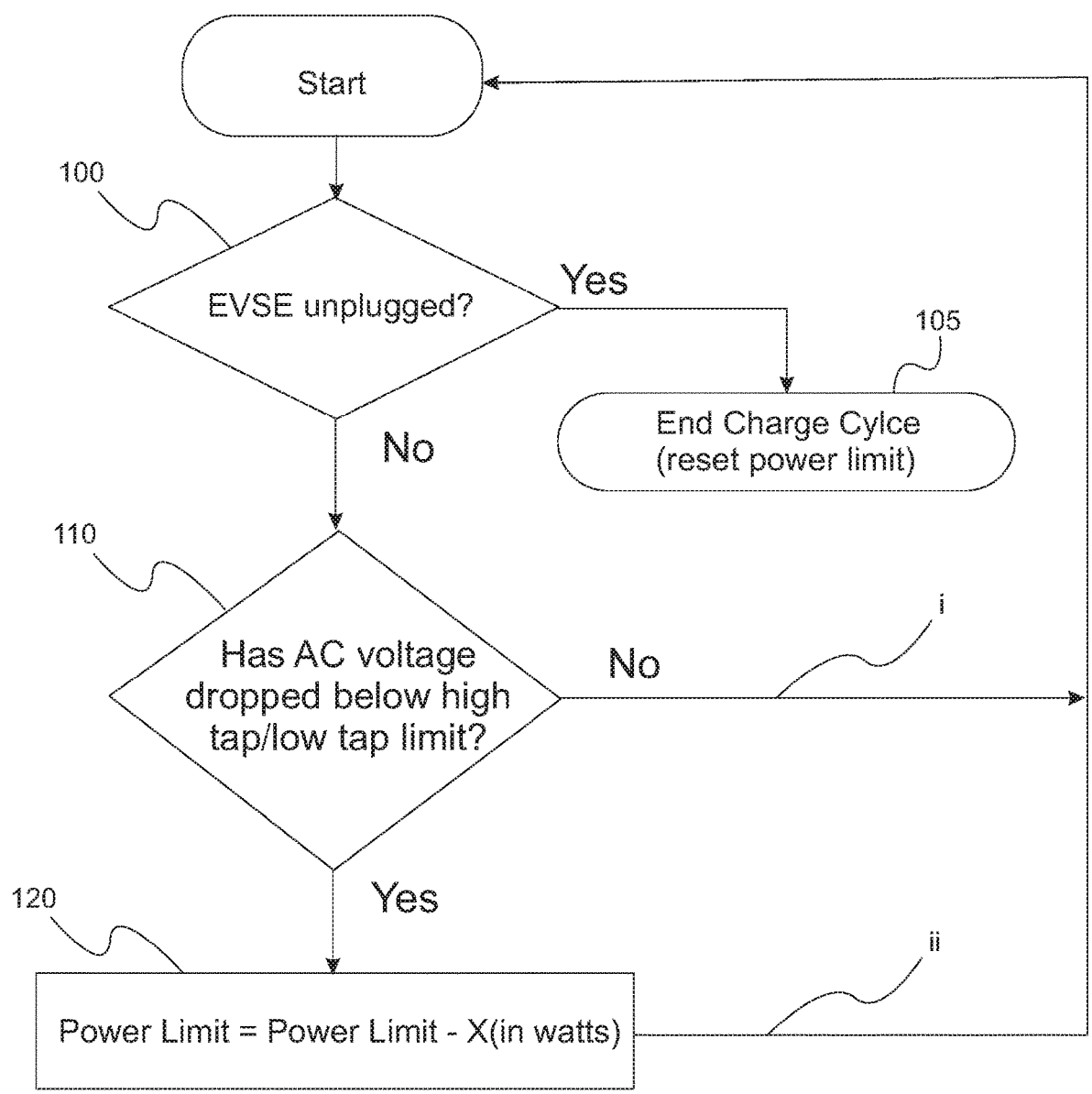
FIG. 2 is a flowchart illustrating a method of charging a high voltage battery that avoids low tap charging.

With reference to FIG. 2, a flowchart depicting a method of charging a battery (e.g., a high voltage battery) in an electric and/or hybrid vehicle using the system of FIG. 1 is provided. As indicated by box 100, the method includes a step of determining if a vehicle is plugged into EVSE 18 which is a prerequisite for battery charging to be initiated. When the vehicle is unplugged from EVSE 18, the charging cycle is halted and the predetermined power limit is reset to its initial value (e.g., the manufacturer's power rating, see below) as indicated in box 105. If the vehicle is plugged into EVSE 18, the input AC voltage from AC voltage power supply 20 provided to the voltage converter is measured. Characteristically, voltage converter 24 draws a predetermined maximum power limit (i.e., the high tap/low tap limit) from AC voltage power supply 20. Initially, the predetermined maximum power limit can set to an initial maximum power limit. Typically, this initially maximum power limit is the manufacturer's specified maximum power limit for voltage converter 24 or a value +/−10 percent thereof. As indicated by box 110, a determination is made as to whether or not the AC input voltage is below a predetermined input voltage setpoint. If the AC input voltage is not below the setpoint, the method cycles back to execute the steps associated with box 100 as indicated by loop i). If the AC input voltage is below the setpoint, an updated maximum power limit is determined as the predetermined maximum power limit minus a predetermined amount X if the input voltage is below a predetermined input voltage setpoint. The predetermined maximum power limit is then set to the updated maximum power limit. In particular, the predetermined maximum power limit is:

mpl=ipl for a first execution of the steps of box 110; and mpl=upl for each repeated execution of the steps of box 110 wherein:

mpl is the predetermined maximum power limit;

ipl=is the initial maximum power limit;

upl is an updated maximum power limit which is equal to a current maximum power limit minus the predetermined amount X.

The steps associated with boxes 100, 110 and 120 are iteratively repeated as indicated by loop ii) until the input voltage from the alternating current voltage power supply provided to the voltage converter is above or equal to the predetermined input voltage setpoint. In a refinement, there is a predetermined delay between each iteration (i.e. from voltage measurement to voltage measurement). Although this predetermined delay can be from about 0.1 seconds to about 10 seconds.

In a variation, the AC voltage power supply 20 provides between 210 and 230 VAC when unloaded. In particular, the AC voltage power supply 20 provides about 220 VAC when unloaded. For voltages in this range, the predetermined input voltage setpoint can be from about 170 VAC to about 200 VAC. A setpoint of about 180 VA is found to be particularly useful.

The advantages of the present invention compared to the prior art can be appreciated by the following example. A charger that does not implement the method of FIG. 2 starts charging at the 7000 W power limit level. Drawing this amount of power causes the AC voltage to sag so much that a tap cross occurs. The OBCM then switches to low tap and continues to charge at a 3500 W limit. A charger with the flow chart implemented starts charging at the 7000 W power limit level. Drawing this amount of power causes the AC voltage to sag so much that a tap cross occurs. The OBCM then switches to a lower power level and finds drawing 6000 W does not cause a tap cross. The OBCM continues charging at this lower power level and charges the battery faster than the system operating with a low tap power limit.

Figure 3:
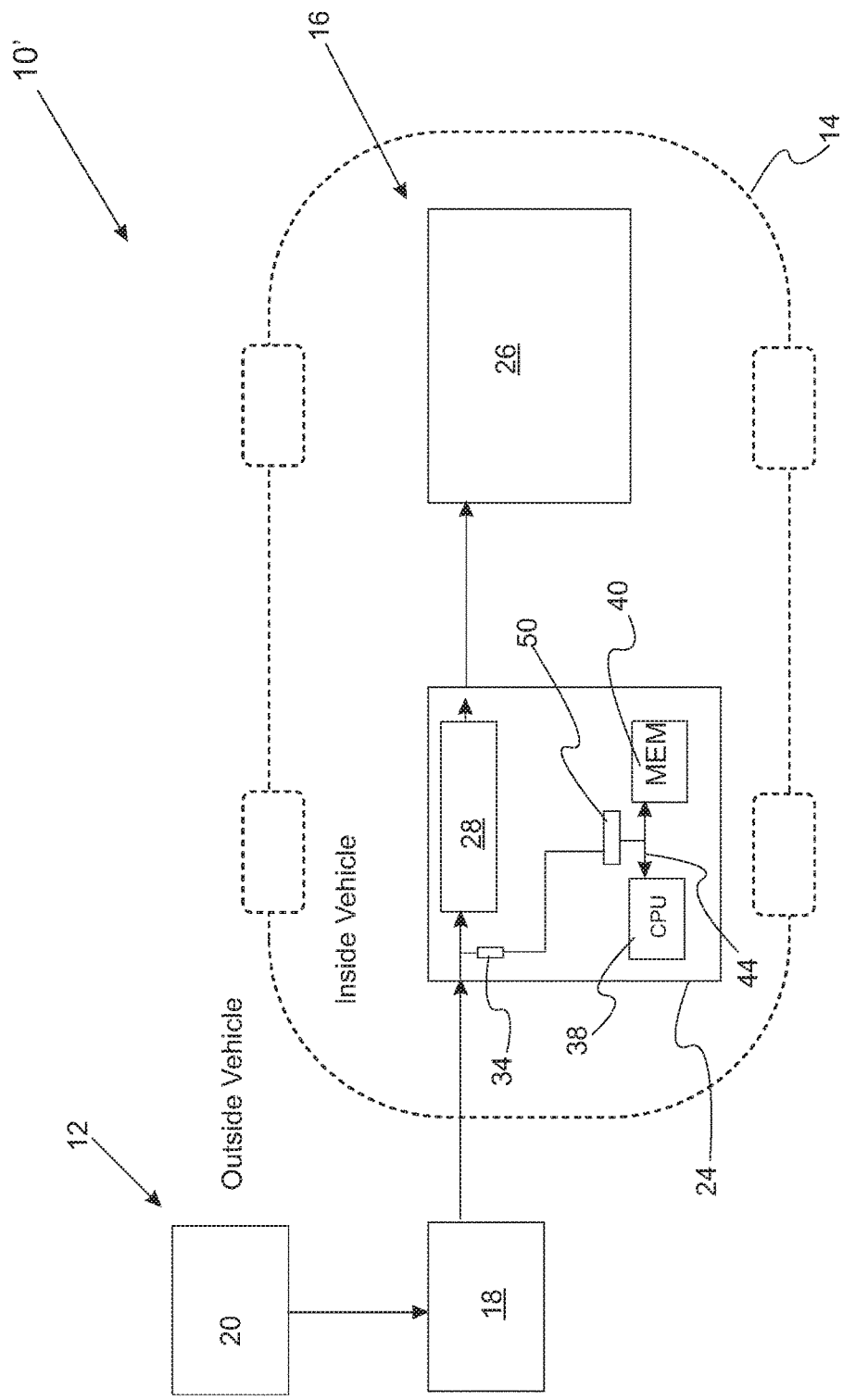
FIG. 3 is a schematic of a battery charging system for charging a high voltage battery in an electric or hybrid electric vehicle that uses a computer processor.

With reference to FIG. 3, a schematic of a variation of the system of FIG. 1 that implements the method of FIG. 2 is provided. Vehicle charging system 10' includes external components 12 that are located external to a vehicle and internal components 16 that are within the vehicle. External components 12 include electric vehicle supply equipment (EVSE) 16 which is in communication with alternating current AC) voltage power supply 20 (e.g., an electrical power grid). EVSE 18 provides power for charging to electrical bus 20 from AC voltage power supply 20. Typically, an alternating current (AC) voltage is used for charging. Internal components 16 include onboard controller module (OBCM) 24 which receives power from EVSE 18 through electrical bus 20. OBCM 24 converts the input signal form an AC voltage to a direct current (DC) voltage to be used to charge high voltage battery 26 which is in electrical communication with OBCM 24. Typically, the voltage conversion is accomplished by voltage converter 24. Voltage converter 24 has an input 30 that receives an alternating voltage input and an output 32 that outputs a direct current voltage typically to high voltage battery 26. Voltage converter 24 has a configurable maximum power limit that the voltage converter can draw. Voltage sensor 34 performed a voltage measurement input voltage to the voltage converter 24. Computer processor 38 receives the voltage measurement from the voltage sensor 34. Computer processor 38 is configured to send a control signal to the voltage converter to by iteratively reducing its power limit by a configurable amount (X) to avoid a tap cross as set forth above with respect to the description associated with FIG. 3. It should be appreciated that virtually any type of computer processor may be used, including microprocessors, multicore processors, and the like. In this regard, computer processor 38 executes one or more of the steps of FIG. 2. In particular, computer process 38 executes steps of:

a) receiving the voltage measurement of the input voltage from the alternating current voltage power supply provided to the voltage converter, the voltage converter drawing a predetermined maximum power limit from the alternating current voltage power supply, the predetermined maximum power limit being initially set to an initial maximum power limit;

b) determining an updated maximum power limit as the predetermined maximum power limit minus a predetermined amount X if the input voltage is below a predetermined input voltage setpoint;

c) setting the predetermined maximum power limit to the updated maximum power limit; and d) iteratively repeating steps a), b) and c) until the input voltage from the alternating current voltage power supply provided to the voltage converter is above or equal to the predetermined input voltage setpoint.

In a variation, vehicle charging system 10' includes computer memory 40 that stores computer code for he steps of the method typically. Computer memory 40 is accessible to computer processor 38 typically via connection system 44. In a variation, connection system 44 includes a data bus. In a refinement, computer memory 44 includes a computer-readable medium which can be any non-transitory (e. g., tangible) medium that participates in providing data that may be read by a computer. Specific examples for computer memory 14 include, but are not limited to, random access memory (RAM), read only memory (ROM), hard drives, optical drives, removable media (e.g. compact disks (CDs), DVD, flash drives, memory cards, etc.), and the like, and combinations thereof. In another refinement, computer processor 38 receives instructions from computer memory 40 and executes these instructions, thereby performing one or more processes, including one or more of the processes described herein. Computer-executable instructions may be compiled or interpreted from computer programs created using a variety of programming languages and/or technologies including, without limitation, and either alone or in combination, Java, C, C++, C#, Fortran, Pascal, Visual Basic, Java Script, Perl, PL/SQL, etc. Vehicle charging device 10' also optionally includes various in/out ports 20 through which data from voltage sensor may be accessed by computer processor 38. Ports 50 can also be used to gain access to computer processor 38 and/or computer memory 40 to run diagnostic test and/or to reprogram the system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for charging a battery from an alternating current voltage power supply through a voltage converter, the method comprising:

a) measuring an input voltage from the alternating current voltage power supply provided to the voltage converter, the voltage converter drawing a predetermined maximum power limit from the alternating current voltage power supply, the predetermined maximum power limit being initially set to an initial maximum power limit;

b) determining an updated maximum power limit as the predetermined maximum power limit minus a predetermined amount X if the input voltage is below a predetermined input voltage setpoint;

c) setting the predetermined maximum power limit to the updated maximum power limit; and d) iteratively repeating steps a), b) and c) until the input voltage from the alternating current voltage power supply provided to the voltage converter avoids a tap cross, the tap cross being avoided by the input voltage being above or equal to the predetermined input voltage setpoint.

2. The method of claim 1 wherein the predetermined maximum power limit is:

mpl=ipl for a first execution of step a); and
mpl=upl for each repeated execution of step a;

wherein mpl is the predetermined maximum power limit; ipl=is the initial maximum power limit; and upl is the updated maximum power limit which is equal to a current predetermined maximum power limit minus the predetermined amount X.

3. The method of claim 1 wherein the alternating current voltage power supply provides between 210 and 230 VAC when unloaded.

4. The method of claim 3 wherein the alternating current voltage power supply provides about 180 VAC when unloaded.

5. The method of claim 1 wherein a computer processor set the predetermined maximum power limit of the voltage converter.

6. The method of claim 5 wherein the input voltage is measured with a voltage sensor that provides a voltage measurement to the computer processor.

7. The method of claim 1 wherein an onboard control module includes the voltage converter.

8. The method of claim 1 wherein the alternating current voltage power supply is coupled to the voltage converter through electric vehicle supply equipment.

9. The method of claim 8 wherein the predetermined maximum power limit of the voltage converter is reset to the initial maximum power limit when a vehicle is disconnected from the electric vehicle supply equipment.

10. The method of claim 1 wherein there is a predetermined delay between each iteration.

11. A system for charging a battery in an electric or hybrid vehicle the system comprising:

a voltage converter having an input that receives an AC voltage input and an output that outputs a direct current voltage, the voltage converter having a configurable maximum power limit that the voltage converter can draw;

a voltage sensor that performs a voltage measurement of the AC input voltage to the voltage converter; and a computer processor that receives the voltage measurement from the voltage sensor, the computer processor configured to send a control signal to the voltage converter to by iteratively reducing its power limit by a configurable amount (X) and then retry charging at a lower level such that a tap cross is avoided.

12. The system of claim 11 wherein the computer processor executes steps of:

a) receiving the voltage measurement of the AC voltage input provided to the voltage converter, the voltage converter drawing a predetermined maximum power limit from an alternating current voltage power supply, the predetermined maximum power limit being initially set to an initial maximum power limit;

b) determining an updated maximum power limit as the predetermined maximum power limit minus a predetermined amount X if the AC voltage input is below a predetermined input voltage setpoint;

c) setting the predetermined maximum power limit to the updated maximum power limit; and d) iteratively repeating steps a), b) and c) until the AC voltage input from the alternating current voltage power supply provided to the voltage converter is above or equal to the predetermined input voltage setpoint.

13. The system of claim 12 wherein the predetermined maximum power limit is:

mpl=ipl for a first execution of step a); and mpl=upl for each repeated execution of step a;

wherein mpl is the predetermined maximum power limit; ipl=is the initial maximum power limit; and upl is the updated maximum power limit which is equal to a current predetermined maximum power limit minus the predetermined amount X.

14. The system of claim 12 wherein the alternating current voltage power supply provides between 210 and 230 VAC when unloaded.

15. The system of claim 12 wherein the alternating current voltage power supply provides about 180 VAC when unloaded.

16. The system of claim 11 wherein an onboard control module includes the voltage and the computer processor.

17. The system of claim 12 wherein the alternating current voltage power supply is coupled to the voltage converter through electric vehicle supply equipment.

18. The system of claim 17 wherein the predetermined maximum power limit of the voltage converter is reset to the initial maximum power limit when a vehicle is disconnected from the electric vehicle supply equipment.

19. The system of claim 11 wherein there is a predetermined delay between each iteration.

20. A method for charging a battery from an alternating current voltage power supply through a voltage converter, the method comprising:

a) measuring an input voltage from the alternating current voltage power supply provided to the voltage converter, the voltage converter drawing a predetermined maximum power limit from the alternating current voltage power supply, the predetermined maximum power limit being initially set to an initial maximum power limit;

b) determining an updated maximum power limit as the predetermined maximum power limit minus a predetermined amount X if the input voltage is below a predetermined input voltage setpoint;

c) setting the predetermined maximum power limit to the updated maximum power limit; and d) iteratively repeating steps a), b) and c) until the input voltage from the alternating current voltage power supply provided to the voltage converter is above or equal to the predetermined input voltage setpoint.

* * * * *